United States Patent Office 3,644,612
Patented Feb. 22, 1972

3,644,612
METHOD FOR HARDENING UNSATURATED POLYESTER RESINS
Heinz Meyer and Dieter Schmid, Munich, Hans Schwarzer, Krailling, and Hansjoachim Twittenhoff, Strassblach, Germany, assignors to Eleitrochemische Werke Munchen AG, Hollriegelskreuth, near Munich, Germany
No Drawing. Filed July 22, 1969, Ser. No. 843,798
Claims priority, application Germany, Aug. 2, 1968, P 17 69 898.5
Int. Cl. C08g 17/16; C09d 3/64
U.S. Cl. 260—22 CA                       19 Claims

ABSTRACT OF THE DISCLOSURE

Method for hardening unsaturated polyester resins comprising utilizing for the hardening a mixture of metal accelerator, peroxide and an aliphatic polyamine.

---

This invention relates to a method for the hardening of unsaturated polyester resins.

More particularly this invention relates to a novel hardening agent for hardening unsaturated polyester resins comprising a metal accelerator, peroxide and an aliphatic amine.

The term "unsaturated polyester resins" according to the invention designates mixtures of one or more unsaturated polyesters with one or more unsaturated compounds, which can react with one another under formation of three-dimensional cross-linkages.

Unsaturated polyesters are obtained by esterifying a saturated or unsaturated dicarboxylic acid or the anhydride thereof with a saturated or unsaturated poly-valent alcohol. Such acids, which can be used alone or together in the form of mixtures, include for instance, maleic-, fumaric-, or itaconic acid and the like. They can be partially replaced by one or more saturated dicarboxylic acids, such as for instance, adipic acid, sebacic acid or succinic acid, as well as by aromatic dicarboxylic acids, such as for instance, phthalic acid, tetrahydrophthalic acid or the anhydrides thereof, which also can be present in the form of mixtures thereof. Suitable polyols which again can be used individually or as mixtures include for example, ethylene glycol, diethylene glycol, (2,2' - dihydroxydiethyl ether), triethylene glycol, (ethylene glycolbis-(2-hydroxyethyl)-ether, propandiol-1,2; butane diol-1,3; 2,2-dimethyl propane diol-1,3; butene(2)-diol-1,4 and many others. The acids, anhydrides and alcohols which are suitable for use in the esterification can also be substituted as for instance by halogen atoms. Examples of suitable halogenated acids include tetrachlorphthalic acid; 1,4,5,6,7,7 - hexachlor-bicyclo(2,2,1)-heptene(5)-2,3-dicarboxylic acid, their anhydrides and the like.

The unsaturated polyesters which have been obtained as described above are dissolved in a reactive monomer such as styrene, methylmethacrylate and other like acrylic compounds, divinyl benzene, diallylphthalate, alkyl esters of fumaric or maleic acid as well as in other polymerizable solvents. The aforesaid monomers can also be used together in the form of their mixtures. For example, suitable monomer solvents include mixtures of styrene and methylmethacrylate, styrene and diallylphthalate, or styrene and dialkylfumarate. The monomer-solvents can also be partially substituted by halogen as for example dibromostyrene.

It is known in the art to harden unsaturated polyester resins (UP resins) in the presence of radical donors as for example in the presence of peroxides, under the application of heat. A hardening at lower temperatures, down to room temperature is possible if there is simultaneously present an accelerator and in particular of a salt of a heavy metal and in some cases if in addition to the peroxide there is present a tertiary aromatic amine.

Furthermore, it is known to use as the accelerator a combination of a metal accelerator and a tertiary aromatic amine as promotor, whereby there is realized faster hardening. It is known to add tertiary aromatic amines alone for the hardening UP-resins by means of a diacylperoxide where the hardening is carried out at room temperature. In U.S. Pat. 2,449,299 there is described the use of secondary aromatic amines together with diacylperoxides for cold-hardening UP-resins. As experience has established, the latter method is, however, unsatisfactory, and is operative at all only with very highly reactive UP-resins. A cold-hardening of UP-resins carried out with peresters or perketals, secondary aromatic amines in admixture with the conventional cobalt accelerators is not possible at all in practice, as the gelling time amounts to in excess of 6 hours.

All of the hardening systems utilized heretofor and which become effective only in the presence of a promotor show association with two essential disadvantages:

(1) The hardening at low temperatures (about 0° C.) is very slow and incomplete.
(2) The systems are very sensitive to substances which have an inhibiting effect and thus also to the conventional UP resin stabilizers. Therefore, a satisfactory use of this system is only possible in the case of specific UP resins.

It is further known that epoxy resins can be hardened by the addition of aliphatic polyamines. The use of aliphatic polyamines does not, however, result in the case of UP-resins in a technically usable reaction.

It has now surprisingly been found, in accordance with the invention that UP resins at room temperature can be satisfactorily hardened and also at lower temperatures if as hardening agent for the UP-resin there is employed a mixture of a peroxide, metal accelerator and aliphatic polyamine. The individual components of which the system is composed of can be present individually or together as mixture.

The method in accordance with the invention for the age-hardening of unsaturated polyester resins, especially at low temperatures, by means of peroxides and activating additions consists in that a combination of metal accelerators with aliphatic polyamines and peroxides is used.

As peroxides there can be used, in accordance with the invention hydroperoxides, peresters of aliphatic and aromatic carboxylic acids, perketals and diacylperoxides. Dialkyl- and diaralkylperoxides have also been found suitable as a component of the hardening system in accordance with the invention, however, these are not as good as the hydroperoxides, perketals and diacylperoxides. The peroxides can be used individually or as mixtures thereof. Advantageously, such peroxides are used which have prolonged storage stabilities in UP resins, i.e., and preferably hydroperoxides, perketals and most preferably peresters, as these types of peroxide exhibit prolonged storage stabilities in connection with the peroxide-containing resin components and thus facilitate the carrying out and operation of the method of the invention.

The aliphatic polyamines which are suitable for use in accordance with the instant invention are aliphatic compounds which carry at least two amino groups. The carbon chain as well as the amine groups can be substituted, as for example, with alkyl-, alkoxy- or aryl groups. Typical examples of polyamines which can be advantageously used within the scope of the invention are, polyalkylene polyamines such as diethylene triamine, triethylene tetramine, tetraethylene pentamine, N,N'-dialkyl-1,3-propylene diamine; N-oxyalkyl-polyalkylene polyamines, such as N-oxethyl-diethylene triamine, N,N',N''-trioxethyl-diethylene triamine and N-oxypropyl-propane diamine.

Salts of cobalt, nickel, iron, manganese or vanadium which are soluble in polyester resins can be used as metal accelerators in accordance with the invention. Examples of suitable salts of these heavy metals include the fatty acid salts, salts of substituted and unsubstituted sulfonic acids, and the like.

The ratio of peroxide to metal accelerator to polyamine as well as the ratio of the three-component hardening agent system in accordance with the invention to the polyester resin to be hardened depends upon the chemical composition of the polyester resin as well as upon the desired hardening velocity and also upon the hardening temperatures which are to be used. In general, the following ratio has proved to be advantageous: peroxide : metal accelerator : polyamine, referred to polyester resin, of 0.5–5% : 0.1–5% : 0.5–10%.

The hardening system in accordance with the invention effects the hardening extremely rapidly (see Table I) even at temperatures down to 0° C., a temperature at which the conventionally known hardening systems react very slowly or not at all.

The hardening of particularly poorly reactive UP resins, for example, of the tough elastic resin types, is very slow when the conventional hardening systems are used. However, in accordance with the invention, such reactive resins can be hardened very rapidly with the hardening combinations in accordance with the invention (see Table II).

The hardening agent in accordance with the invention is particularly insensitive to inhibitors, stabilizers and all inhibiting acting additions, so that even a rapid hardening of tar-containing UP resins is possible (see Table III). This fast is especially surprising, because the extremely strong inhibiting effect of tar is known in connection with the hardening of UP resins.

The low sensitivity of the hardening system in accordance with the invention to inhibitors is of considerable importance with the workability of the resin in the two-component procedure. Both resin components can be kept workable for a long time by the addition of inhibitors thereto, the inhibitor hardly interfering thereafter in the hardening (see Table IV).

The hardening of highly filled UP resin masses with the conventional hardening systems also takes place very slowly and is for this reason very unsatisfactory. The hardener combination in accordance with the invention, however, makes a rapid hardening of such highly filled resin materials possible (see Table IV). This is even true when a portion of the solvent for the UP resin consists of a monomer which only reacts slowly, such as dibutyl fumarate, and is completely surprising when in addition the resin contains large amounts of tar.

The use of the hardener system in accordance with the invention is therefore of particular advantage; for example, for very rapidly hardening two-component adhesives; outdoor work under unfavorable hardening conditions, for instance in applying coatings with UP concrete at low temperatures, as for example, in the production of rapidly hardening street coatings by the spray-process; rapid hardening of slowly reactive resins in the hard fiber spraying process, for instance of resins resistant to chemicals; in general, in the fast workability of resin materials which are slow to react or are strongly inhibiting, which workability is not at all possible or only to an unsatisfactory degree with the conventional hardener systems.

The hardener system of the invention also effects a rapid hardening of UP-resins in admixture with epoxy resins, whereby finished products can be obtained which combine the advantages of both duroplastics.

The following examples serve to further illustrate the invention and the advantages which are realized therewith. In these examples, the following abbreviations have been used:

| | | |
|---|---|---|
| Peroxide | TBPB | Tert.-Butyl-perbenzoate. |
| Do | 2, 2-BPB | 2, 2-bis-(tert.-butylperoxy-)butane. |
| Do | TBHP | Tert.-Butyl-hydroperoxide. |
| Metal accelerator | CoB | Solution of cobalt octoate in styrene with 1% metal content. |
| Do | FeB | Solution of iron octoate in styrene with 1% metal content. |
| Do | MnB | Solution of manganese octoate in in styrene with 1% metal content. |
| Do | NiB | Solution of nickel octoate in styrene with 1% metal content. |
| Do | VB | Solution of vanadium-p-toluene sulfonate in isopropanol with 1% metal content. |
| Aliph. polyamine | DET | Diethylene triamine. |
| Do | DPT | Dipropylene triamine. |
| Do | DDH | 3,4-diamino-3, 4-dimethyl hexane. |
| Do | PDT | Pentamethyl-diethylene triamine. |
| Do | ODP | n-Oxypropyl-1,2-diamnio propane. |
| Arom. amine | MAA | Monoethyl aniline. |
| | MBA | Monobutyl aniline. |
| | DMA | Dimethyl aniline. |
| | DMPT | Dimethyl-p-toluidine. |
| Filler | DBF | Dibutyl fumarate (fumaric acid-bis-n-butyl ester). |
| Resin | UP-resin I | Condensation product consisting of: 4.2 mol propane diol-1,2, 3.1 mol maleic acid anhydride, 1.0 mol phthalic acid anhydride; stabilized with 0.01% of hydroquinone; dissolved in 30 parts by weight styrene to 70 parts polyester. |
| Do | UP-resin II | Condensation product consisting of: 4.2 mol diethylene glycol, 2.6 mol maleic acid anhydride, 1.3 mol phthalic acid anhydride; stabilized with 0.005% hydroquinone; dissolved in 30 parts by weight styrene to 70 parts polyester. |
| Do | UP-resin III | Condensation product consisting of: 2.0 mol neopentyl glycol, 2.0 mol diethylene glycol, 1.0 mol trimethylol propane, 1.0 mol maleic acid anhydride, 0.5 mol phthalic acid anhydride, 3.0 mol adipic acid; stabilized with 0.01% hydroquinone; dissolved in 30 parts by weight of styrene to 70 parts by weight polyester. |

All data in the tables with respect to amounts refer to polyester resin.

EXAMPLE 1

In order to determine the reactivity of the three-component-hardening system in accordance with the invention, the hardening of UP-resins having different compositions was determined using different hardening agent combinations in accordance with the invention. For the purpose of comparison, hardening systems not within the scope of the invention were used in admixture with corresponding proportions of peroxide, metal accelerator or polyamine. The activity determination was made by measuring the hardening-times $t_{gel}$ and $t_{max}$. The test procedures were carried out in the following manner:

50 g. of the UP-resin were stirred in a beaker together with the amounts which have been set out in the tables of accelerator, peroxide and polyamine. The resin as specified was first admixed with inhibitor, filler, pigment, etc.

The gelling time $t_{gel}$ value represents that period of time after which the first striations occur as observed when turning the tilted beaker. In practice, the resin composition after this period of time is no longer flowable and workable.

The value $t_{max}$ value designates that period of time required for the exothermic temperature to have been reached.

The $t_{gel}$ and $t_{max}$ values are calculated starting from the beginning of the addition with stirring of the last active components to the UP-resin.

The measuring of the hardening times was carried out in an atmosphere controlled room at 60% humidity/ 20° C.

The hardening times were measured both at 0° C. and at 10° C. in a thermostatically controlled water bath. The UP-resin was adjusted to the appropriate thermostatically controlled temperature prior to the addition of the individual reactive components. The resulting mixture was then placed into test tubes having a diameter of 30 mm. Thereafter there was introduced into the center of the test tube an exactly centered thermo element by means of which the progress of the hardening could be recorded by way of an automatic graph.

The $t_{gel}$ value designates the period of time after which the temperature of the reacting resin has increased by 5° C. above the bath temperature. The $t_{max}$ as noted above, designates the time after which the exothermic temperature maximum has been reached.

In a number of cases, the resin had gelled during the introduction of the last active components. In these instances, the $t_{gel}$ value is the time after which stirring of the resin is no longer possible. The details and results of the experiments are set out in Table I which follows:

TABLE I.—HARDENING OF UP-RESINS WITH THE HARDENING SYSTEM-ORGAN PEROXIDE/METAL ACCELERATOR/ALIPH. POLYAMINE

| Temperature | Peroxide | Metal accelerator | Amine | UP-resin I $t_{gel}$ | UP-resin I $t_{max}$ | UP-resin II $t_{gel}$ | UP-resin II $t_{max}$ |
|---|---|---|---|---|---|---|---|
| 20° C | 2% TBPB | 1% FeB | | ²>8 | | ²>8 | |
| | Same as above | Same as above | 5% DET | 13″ | 29′ | 15″ | 45″ |
| | do | 1% MnB | | ²>8 | | ²>8 | |
| | do | Same as above | 5% DET | 70″ | 200″ | 170″ | 10′ |
| | do | 1% VB | | 42′ | 55′ | 56′ | 72′ |
| | do | Same as above | 5% DET | 40″ | 160″ | 45″ | 190″ |
| | do | 1% CoB+VB (1:1) | | 95′ | 140′ | | |
| | do | Same as above | 5% DET | 75″ | 130″ | | |
| | do | | Same | 8′ | (¹) | 14′ | (¹) |
| 0° C | do | 1% FeB | do | 55″ | 120″ | | |
| | do | 1% CoB+FeB (1:1) | 3% DET | 24″ | 95″ | | |
| | do | Same as above | 5% DET | 20″ | 70″ | | |
| | do | 1% CoB+VB (1:1) | Same | 60″ | 5′ | | |
| 10° C | do | 1% FeB | do | 27″ | 60″ | | |
| | do | 1% CoB+FeB (1:1) | 3% DET | 14″ | 75″ | | |
| | do | Same as above | 5% DET | 10″ | 50″ | | |
| | do | 1% CoB+VB (1:1) | Same | 32″ | 140″ | | |
| 20° C | 2% 2,2-BPB | 1% CoB | 1% DET | 17″ | 63″ | 60″ | 6′ |
| | Same as above | Same as above | 5% DET | 8″ | 28″ | 20″ | 105″ |
| | do | 1% FeB | Same | 12″ | 200″ | 15″ | 4′ |
| | do | 1% VB | | 7′ | 11′ | | |
| | do | Same as above | 5% DET | 6″ | 45″ | 6″ | 70″ |
| | do | 1% CoB+FeB (1:1) | | ²>24 | | | |
| | do | Same as above | 5% DET | 6″ | 190″ | | |
| | do | | Same | 6′ | 18′ | | |
| 0° C | do | 1% VB | do | 75″ | 5′ | | |
| | do | 1% CoB+FeB (1:1) | do | 25″ | 105″ | | |
| | do | 1% CoB+VB (1:1) | do | 38″ | 220″ | | |
| 10° C | do | 1% VB | do | 14″ | 80″ | | |
| | do | 1% CoB+FeB (1:1) | do | 18″ | 100″ | | |
| | do | 1% CoB+VB (1:1) | do | 13″ | 100″ | | |
| 20° C | 2% TBHP | | do | 8′ | 35′ | | |
| | Same as above | 0.1% CoB | do | 70″ | 11′ | 120″ | 13′ |
| | do | 1% CoB | do | 20″ | 260″ | 50″ | 10′ |
| | do | Same as above | | ²>24 | | ²>24 | |
| | do | 1% VB | | 11′ | 18′ | 13′ | 19′ |
| | do | Same as above | 5% DET | 13″ | 60″ | 10″ | 65″ |
| | do | 1% CoB+VB (1:1) | | 14′ | 34′ | | |
| | do | Same as above | 5% DET | 25″ | 185″ | | |
| | do | 1% FeB | | ²>8 | | ²>8 | |
| | do | 0.1% FeB | 5% DET | 12″ | 20″ | 11″ | 18″ |
| | do | 1% FeB | Same | 7″ | 12″ | 7″ | 13″ |
| | do | 0.1% MnB | do | 35″ | 230″ | 75″ | 10′ |
| | do | 1% MnB | do | 8″ | 30″ | 6″ | 35″ |
| | do | 1% NiB | | ²>8 | | ²8 | |
| | do | Same as above | 5% DET | 90″ | 13″ | 150″ | 16′ |
| | do | 1% CoB+FeB (1:1) | 3% DDH | 8″ | 25″ | | |
| | do | Same as above | 5% DDH | 6″ | 10″ | | |
| | do | 1% CoB+MnB (1:1) | 3% DET | 9″ | 70″ | | |
| | do | Same as above | 5% DET | 6″ | 40″ | | |
| 0° C | do | 1% VB | 5% DPT | 38″ | 180″ | | |
| | do | 1% MnB | 5% DET | 27″ | 75″ | | |
| | do | 1% FeB | 5% DPT | 20″ | 37″ | | |
| | do | 1% CoB+FeB (1:1) | 3% DET | 18″ | 35″ | | |
| | do | Same as above | 5% DET | 15″ | 25″ | | |
| | do | 1% CoB+MnB (1:1) | 3% PDT | 33″ | 140″ | | |
| | do | Same as above | 5% PDT | 23″ | 70″ | | |
| | do | 1% CoB+VB (1:1) | 5% DET | 18″ | 145″ | | |
| 10° C | do | 1% VB | do | 18″ | 150″ | | |
| | do | 1% MnB | Same | 12″ | 50″ | | |
| | do | 1% FeB | do | 13″ | 20″ | | |
| | do | 1% CoB+FeB (1:1) | 3% ODP | 10″ | 20″ | | |
| | do | Same as above | 5% ODP | 8″ | 15″ | | |
| | do | 1% CoB+MnB (1:1) | 3% DET | 13″ | 90″ | | |
| | do | Same as above | 5% DET | 10″ | 60″ | | |
| | do | 1% CoB+VB (1:1) | 5% ODP | 15″ | 95″ | | |
| 20° C | 2% BP-50-P | 1% CoB | {1% DPT / 5% DPT} | 20′ / <30″ | 45′ / 30″ | | |
| | Same as above | 1% FeB | {1% DET / 5% DET} | 17′ / 50″ | 64′ / 7′ | | |
| | do | 1% V-B | {1% DET / 5% DET} | 36′ / 75″ | 90′ / 7′ | | |
| | do | 1% (CoB+FeB 1:1) | {1% DET / 5% DET} | 4′ / 50″ | 13′ / 9′ | | |
| | do | 1% of one of the above mentioned metal accelerators. | | ²))24 | | | |

¹ Not determined. ² Hours.

EXAMPLE 2

As described in Example 1, the hardening times of the hardeing system in accordance with the invention were determined in comparison with that of a hardening system composed only of peroxide and metal accelerator for a low reactive UP resin. The results of these experiments are shown in Table II.

details of these experiments and the gelling time as determined in each case have been set out.

TABLE III.—HARDENING AT 20° C. IN THE PRESENCE OF INHIBITING ADDITIVES

| Peroxide | Metal accelerator | Amine | Additives | Gelling time for hardening of UP-Resin I |
|---|---|---|---|---|
| 2% TBHP | 1% CoB+FeB (1:1) | 5% DET | 20% tar | 15″ |
| Same as above | Same as above | 3% DET | 30% tar | 28″ |
| Do | do | 5% DET | 50% tar | 40″ |
| Do | do | Same | 40% styrene plus 20% tar | 28″ |
| Do | do | do | 40% styrene plus 30% tar | 60″ |
| Do | do | do | 40% styrene plus 50% tar | 60″ |
| Do | do | No amine used | Any one of the abovenamed additives | [1] >>48 |
| 2% TBPB | do | 5% DET | | 15″ |
| Same as above | do | Same | 0.2% Ionol | 35″ |
| 2% TBHP+TBPB (1:1) | do | do | | 15″ |
| | | do | 0.2% Ionol | 40″ |
| 2% TBHP | 1% FeB | 5% DET | | 15″ |
| Same as above | Same as above | Same | 0.2% Ionol | 20″ |
| MEKP | 1% CoB | do | | 7″ |
| Same as above | Same as above | do | 0.2% tert.-butylalcohol | 20″ |
| Do | do | do | 20% tar | [1] >>48 |
| Do | do | do | do | 20″ |
| 4% MEKP | 2% CoB | | do | [1] >>48 |
| Same as above | Same as above | 5% DET | do | 15″ |

[1] Hours.

EXAMPLE 4

The procedure described in Example 1, was repeated and the hardening of UP-resins containing a large proportion of fillers was determined. The details of these experiments and results thereof have been set out in Table IV which follows:

TABLE IV.—HARDENING OF HIGH FILLED UP-RESINS AT 20° C

| Peroxide | Metal accelerator | Amine | Filler | UP-Resin I $t_{gel}$ | $t_{max}$ |
|---|---|---|---|---|---|
| 2% TBHP | 1% CoB+FeB (1:1) | 5% DET | 20% tar | 15″ | 20″ |
| Same | Same as above | Same | 20% tar plus 20% DBF | 30″ | 75″ |
| Do | do | do | 20% tar plus 20 DBF plus 70% quartz | 25″ | 80″ |
| Do | do | do | 20% tar plus 20% DBF plus 70% quartz plus 50% titaniumdioxide | 35″ | 90″ |
| Do | do | do | 30% tar | 35″ | 45″ |
| Do | do | do | 30% tar plus 20% DBF | 90″ | 70″ |
| Do | do | do | 30% tar plus 20% DBF plus 70% quartz | 80″ | 125″ |
| Do | do | do | 30% tar plus 20% DBF plus 70% quartz plus 50% titanium dioxide | 85″ | 145″ |
| Do | do | | Any one of the above-mentioned fillers | [1] >>24 | |

[1] Hours

TABLE II.—HARDENING OF A LOW REACTIVE UNSATURATED POLYESTER RESIN (UP-RESIN III) WITH PEROXIDE/METAL ACCELERATOR/ALIPHAT. POLYAMINE AT 20° C.

| Peroxide | Metal accelerator | Amine | Hardening time $t_{gel}$ | $t_{max}$ |
|---|---|---|---|---|
| 2% TBPB | 2% CoB/FeB (1:1) | | [1] >>24 | |
| Same | Same as above | 2% DET | 45″ | 3′35″ |
| Do | do | 2% DPT | 50″ | 3′50″ |
| Do | do | 5% DET | 20″ | 70″ |
| Do | do | 5% DPT | 20″ | 75″ |
| 2% TBHP | do | | [1] >>24 | |
| Same | do | 5% DET | 15″ | 40″ |
| Do | do | 5% DPT | 18″ | 45″ |
| 2% (TBPB+TBHP 1:1) | do | | [1] >>24 | |
| Same | do | 5% DET | 20″ | 75″ |
| Do | do | 5% DPT | 20″ | 70″ |

[1] Hours.

EXAMPLE 3

The method described in Example 1 was again repeated and the hardening of UP resins in the presence of inhibiting acting additives determined. In Table III, the

EXAMPLE 5

The hardening system in accordance with the invention has also proved to be effective for hardening mixtures of UP-resins with epoxy resins. This was demonstrated by a series of experiments, the results of which are set out in the following Table V.

TABLE V.—HARDENING OF A REACTIVE UP-RESIN IN ADMIXTURE WITH AN EPOXY RESIN (UP RESIN I POLYESTER RESIN) PEROXIDE 2% TBHP

| Metal accelerator | Amine | Further additions | Gelling time at 20° C. | Temp., maximum |
|---|---|---|---|---|
| 1% (CoB+FeB 1:1) | 5% DET | 20% Epikote 828[1] | 8″ | 13″ |
| Same as above | 5% DPT | do | 20″ | 33″ |
| Do | 5% DET | 20% Epikote 828 plus 100% tar | 2′ | 10′ |
| Do | 5% DPT | do | 5′ | 17′ |
| 4% (CoB+FeB 1:1) | 5% DET | 20% DET Epikote 828 plus 100% tar | 45″ | 180″ |
| Same as above | Same | 20% Epikote 828 plus 100% tar plus 70% quartz flour | 60″ | 7′ |

[1] Epikote: Registered trademark of SHELL for an ethoxyline resin (Epoxide).

EXAMPLE 6

(Comparison example)

The hardening system in accordance with the invention composed of a peroxide, metal accelerator and aliphatic polyamine is appreciably superior to the known combination of peroxide, metal accelerator and aromatic amine. This has been demonstrated by the comparison experiments and experimental results which have been described in connection with Examples 1 to 5 and was also established by the experiments and the results thereof which are set out in Table VI which follows. The foregoing is also true when in the three-component system there is also used as amine a secondary aromatic amine.

TABLE VI.—HARDENING OF UP-RESIN I WITH AN OR PEROXIDE/METAL/ACCELERATOR/AROMATIC AMINE AT 20° C.

| Peroxide | Metal accelerator | Amine | $t_{gel}$ | $t_{max.}$ |
|---|---|---|---|---|
| 2% TBPB | 1% VB | | 42' | 55' |
| Do | do | 5% MAA | 150' | 245' |
| Do | 1% CoB+VB (1:1) | | 95' | 140' |
| Do | do | 5% MAA | '>6 | |
| Do | do | 5% MBA | '>6 | |
| Do | do | 5% MBA | '>6 | |
| 2% 2,2-BPB | 1% VB | | 7' | 11'' |
| Do | do | 5% MAA | '>6 | |
| Do | do | 5% MBA | '>6 | |
| Do | 1% CoB | 5% MAA | '>6 | |
| Do | do | 5% MBA | '>6 | |
| 2% TBPB | 1% FeB | 5% DMA | '>8 | |
| Do | do | 5% DMPT | 45' | |
| Do | 1% CoB+FeB (1:1) | 5% DMA | 39' | |
| 2%, 2,2-BPB | 1% CoB | 5% DMA | 28' | |
| Do | do | 5% DMPT | 16' | |
| Do | 1% CoB+FeB (1:1) | 5% DMA | 33' | |

¹ Hours.

What is claimed is:

1. Self-hardening unsaturated polyester resin composition which composition comprises an unsaturated polyester resin with at least one unsaturated compound capable of forming cross-linkage with said polyester resin; and, as a hardening agent, a synergistically effective mixture of a peroxide selected from the group consisting of hydroperoxides, peresters, perketals, diacyl peroxides and mixtures thereof, an aliphatic polyamine containing at least two amino groups, and a metal accelerator selected from the group consisting of metal salts of fatty organic carboxylic acids, metal salts of sulfonic acids and mixtures thereof wherein said metal salt is a salt of a member selected from the group consisting of cobalt, nickel, iron, manganese and vanadium.

2. Self-hardening composition according to claim 1 wherein said peroxide is a member selected from the group consisting of peresters, perketals and diacyl peroxides and mixtures thereof.

3. Self-hardening composition according to claim 1 wherein said aliphatic polyamine is a member selected from the group consisting of unsubstituted polyalkylene polyamines and N-oxyalkyl-polyalkylene polyamines.

4. Self-hardening composition according to claim 3 wherein said polyamine is a member selected from the group consisting of diethylene triamine, triethylene tetramine, tetraethylene pentamine, N,N'-dialkyl-1,3-propylene diamine, N-oxethyl-diethylene triamine, N,N',N'' - trioxethyl-diethylene triamine and N-oxypropylpropane diamine.

5. Composition according to claim 4 wherein said peroxide is a member selected from the group consisting of peresters, perketals, and diacylperoxides and mixtures thereof.

6. Composition according to claim 4 wherein said peroxide, metal accelerator and polyamine are used in a weight ratio of 0.5–5%:0.1–5%:0.5–10% based on the polyester resin.

7. Composition according to claim 4 wherein said unsaturated polyester resin is admixed with an inhibiting material.

8. Composition according to claim 4 wherein said unsaturated polyester resin is admixed with tar in an amount up to 50%.

9. Composition according to claim 4 wherein said unsaturated polyester resin is admixed with a filler.

10. Composition according to claim 4 wherein said unsaturated polyester resin is present in admixture with an epoxy resin.

11. A self-hardening composition according to claim 1 wherein the hardening agent is a synergistically effective mixture of tert.-butyl-perbenzoate, iron octoate and diethylene triamine.

12. A self-hardening composition according to claim 1 wherein the hardening agent is a synergistically effective mixture of tert.-butyl-perbenzoate, manganese octoate and diethylene triamine.

13. A self-hardening composition according to claim 1 wherein the hardening agent is a synergistically effective mixture of tert.-butyl-perbenzoate, vanadium-p-toluene sulfonate and diethylene triamine.

14. A self-hardening composition according to claim 1 wherein the hardening agent is a synergistically effective mixture of tert.-butyl-perbenzoate, cobalt octoate, iron octoate and diethylene triamine.

15. A self-hardening composition according to claim 1 wherein the hardening agent is a synergistically effective mixture of 2,2-bis-(tert.-butylperoxy)-butane, cobalt octoate and diethylene triamine.

16. A self-hardening composition according to claim 1 wherein the hardening agent is a synergistically effective mixture of tert.-butyl-perbenzoate, cobalt octoate, manganese octoate and 3,4-diamino-3,4-dimethylhexane.

17. A self-hardening composition according to claim 1 wherein the hardening agent is a synergistically effective mixture of tert.-butyl-perbenzoate, cobalt octoate, iron octoate and N-oxypropyl-1,2-diaminopropane.

18. Composition as claimed in claim 1 wherein the said peroxide is present in an amount of from 0.5 to 5%, the metal accelerator is present in an amount of from 0.1 to 5% and the polyamine is present in an amount of from 0.5 to 10% by weight, based on the weight of the polyester resin.

19. A process for hardening unsaturated polyester resins which comprises contacting a composition comprising an unsaturated polyester resin and at least one unsaturated compound capable of reacting with said polyester resin to form cross-linkages, with as a hardening agent, a synergistically effective mixture of a peroxide selected from the group consisting of hydroperoxides, peresters, perketals, diacyl peroxides and mixtures thereof, and aliphatic polyamine containing at least two amino groups, and a metal accelerator; at a temperature of from 0 to 20° C.

References Cited

UNITED STATES PATENTS

| 2,450,552 | 10/1948 | Hurdis | 260—865 |
| 2,642,410 | 6/1953 | Hoppens | 260—863 |
| 2,852,405 | 9/1958 | Myers et al. | 106—264 |
| 2,898,259 | 8/1959 | Wheelock | 260—864 |
| 3,046,851 | 7/1962 | de Vries | 260—22 |
| 3,166,431 | 1/1965 | Mullaly | 106—264 |

FOREIGN PATENTS

| 658,392 | 2/1963 | Canada | 260—863 |
| 327/63 | 1/1963 | Japan | 260—864 |

DONALD E. CZAJA, Primary Examiner

R. W. GRIFFIN, Assistant Examiner

U.S. Cl. X.R.

106—310; 117—161 K, 161 ZB; 260—28.5 R, 40 R, 75 UA, 835, 863, 864, 865

UNITED STATES PATENT OFFICE
CERTIFICATE OF CORRECTION

Patent No. 3,644,612     Dated February 22, 1972

Inventor(s) Heinz Meyer, Dieter Schmid, Hans Schwarzer, Hansjoachim Twittenhoff

It is certified that error appears in the above-identified patent and that said Letters Patent are hereby corrected as shown below:

Col. 3, line 36

"fast" should be --fact--

Col. 7, line 24

"hardeing" should be --hardening--

Col. 8, Table IV

6th item from top, last column

"70" should be --170--

Col. 9, Table VI

Delete 6th line

Signed and sealed this 18th day of July 1972.

(SEAL)
Attest:

EDWARD M. FLETCHER, JR.
Attesting Officer

ROBERT GOTTSCHALK
Commissioner of Patents